UNITED STATES PATENT OFFICE.

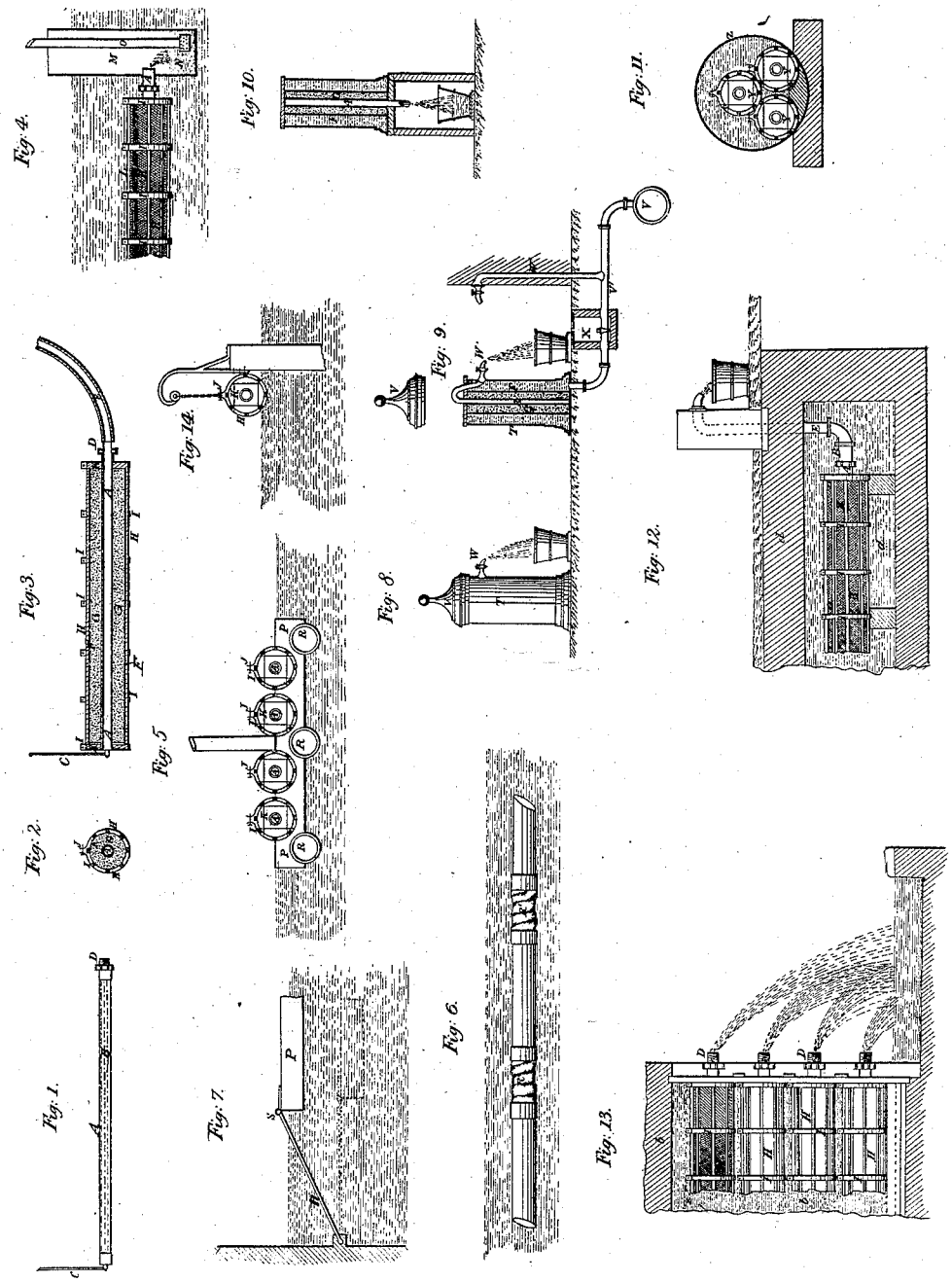

NADAULT DE BUFFON, OF PARIS, FRANCE.

APPARATUS FOR FILTERING LIQUIDS.

Specification of Letters Patent No. 17,028, dated April 14, 1857.

*To all whom it may concern:*

Be it known that I, NADAULT DE BUFFON, of No. 13 Rue du Cherche-Midi, Paris, in the Empire of France, have invented a new Apparatus for Clarifying and Purifying Water and other Liquids; and I do hereby declare that the following is a full and exact description thereof, reference being had to the accompanying drawing and to the letters which indicate in all the figures parts which are similar.

My invention consists in the employment of a cylindrical tube of iron or other suitable metal surrounded by a cylinder of wire gauze, containing charcoal or other filtering material. A light wooden casing through which the water passes is then placed around and at the end of the cylinders, the whole being bound together by light iron hoops (rendered inoxidable) which by the aid of screws compress the filtering materials.

This improved apparatus, which may be immersed in or float upon the impure water, allows the latter to pass through the external wire gauze cylinder and the filtering materials to the internal perforated tube, which it reaches in its purified state.

This apparatus is chiefly applicable to filtering on a large scale, river and other waters for distribution.

Figure 1, of the annexed drawing represents an elevation of the internal tube, Fig. 2 is a transverse section, and Fig. 3 a longitudinal section of the improved filter.

The internal tube A, is composed of zinc, copper, galvanized iron, or wrought iron, covered with a coat of red lead or other paint to prevent oxidation. This tube is perforated throughout with a series of holes or openings B, through which the filtered water passes. It is furnished at one end with a small air tube C, which allows the air to enter the tube to insure a continuous flow of water. At the opposite end is fixed a copper or brass screw joint D, to which is screwed the end of a flexible or other pipe E, communicating with a pump or reservoir. This perforated filtering tube is surrounded by a wire gauze cylinder F, also preserved from oxidation. The space between the two cylinders is filled according to circumstances with siliceous sand, and animal or vegetable charcoal in powder, washed cinders, sponge or moss cut and mineralized, mixed with charcoal, cinders, shearings of woollen and felt stuff, &c. (G). These substances may be employed either separately or mixed, forming different strata, having permeable materials placed between them. The outer cylinder F, is then furnished with a wooden casing H, placed so as to allow the water to pass through. I I, are binding rings furnished with a tightening screw J J, for compressing the filtering materials transversely. These materials are also pressed in a longitudinal direction by two metal or wooden disks K K', placed at each end of the cylinders by means of a screw press. They are retained in position by iron rods or key pieces and when necessary by parallel counter key pieces placed between them at suitable distances.

Fig. 4, represents a portion of a complete tubular filter L, immersed in impure water. M is a reservoir into which the filtered water N flows from the internal tube A. The pure water is then withdrawn by the pipe O connected with a pump. These improved filters are employed in two ways viz: floating and under high pressure. In the former case, one or more of the filters are placed in a wooden frame P, as in Fig. 5, showing an end view of four cylinders thus employed. These are rendered capable of immersion at any depth by pumping a certain quantity of water into the zinc or galvanized iron floats R by a small pump, or a counterpoise of iron, with a chain working over a pulley may be used for the same purpose. Instead of metallic floats, ordinary barrels may be employed.

The water service pipe in connection with the floating filters are provided with flexible joints R' of india rubber, gutta percha, leather or other suitable material as shown in Fig. 6 which allows of changes of position caused by the raising or lowering of the floating wooden frame or platform P, Fig. 5. To avoid the dragging of this pipe, two wooden or iron rods R, are attached to the frame P, by a hinge joint S, the opposite working loosely in another hinge joint as represented in Fig. 7.

In the adoption of the high pressure system the water is derived from an upper reservoir. One of the improved filters employed in connection with this reservoir is shown in elevation and section in Figs. 8 and 9. It consists of the same arrangements for filtering as those before described placed in an iron casing T, provided with a cover U. The water is taken from the main pipe V, and branch pipe V' by which it enters the filter and passes out of the stop cock W, in a purified state; W' pipe from which is drawn the water not filtered, X cistern.

Fig. 10, represents a section of the same filter in a reversed position.

Fig. 11, shows in section an arrangement of three tubular filters Y, placed in a cylinder 2, containing impure water, which improved filters under a moderate pressure furnish a large supply of purified water.

Fig. 12, is a section of a covered underground water reservoir $a$ constructed of masonry, in which one or several filters may be placed, which arrangement is suitable for supplying the public way with filtered water.

Fig. 13, is a sectional view of a series of fourteen cylindrical filters placed one over the other in a suitable brick reservoir $b$ and by this means enabling the filters under high pressure to furnish a large supply of pure water which flows from the internal filtering tubes A, to the cistern $c$.

The above arrangements offer great facilities for cleaning the filters from impurities, which process in the filters at present in use is very laborious and expensive. For the above purpose it is simply necessary to float or raise the filters to the surface of the water by a small windlass with a winch handle Fig. 14 and expose them to a stream of water from a pipe communicating with a pump on upper reservoir. In the case where there is a rapid current of water as in a river, no deposit takes place on the filters which therefore require little cleansing. Where the filters are stationary, the following means may be adopted for cleaning them. A flexible tube E Fig. 3, proceeding from an upper reservoir is screwed to one end of the internal tube A of the filter, the other extremity of which is closed thus enabling the pressure of the water to remove the sediment deposited on the exterior surface. Another mode of cleansing is by the use of a brush or broom. These improved filters from their simplicity of construction and efficiency are suitable in all cases where water or other liquid requires to be filtered.

Having now described the nature of my said invention and the most convenient modes of putting it into execution I wish it to be understood that what I claim is—

1. The general arrangement and construction of tubular apparatus for filtering water and other liquids as hereinbefore described and shown in the annexed drawings.

2. The mode of constructing stationary and tubular filters, in which the impure water to be clarified is passed from the exterior to the interior of the filter, as hereinbefore described and repesented in the accompanying drawing.

3. The compressing of the filtering material as hereinbefore described.

NADAULT DE BUFFON.

Witnesses:
DE FONTAINEMOREAU,
J. W. SIMONS, Jr.